April 15, 1947.                    T. R. FISHER                    2,418,872
                          DUPLEX INDICATING TEST PROD
                             Filed Feb. 6, 1945
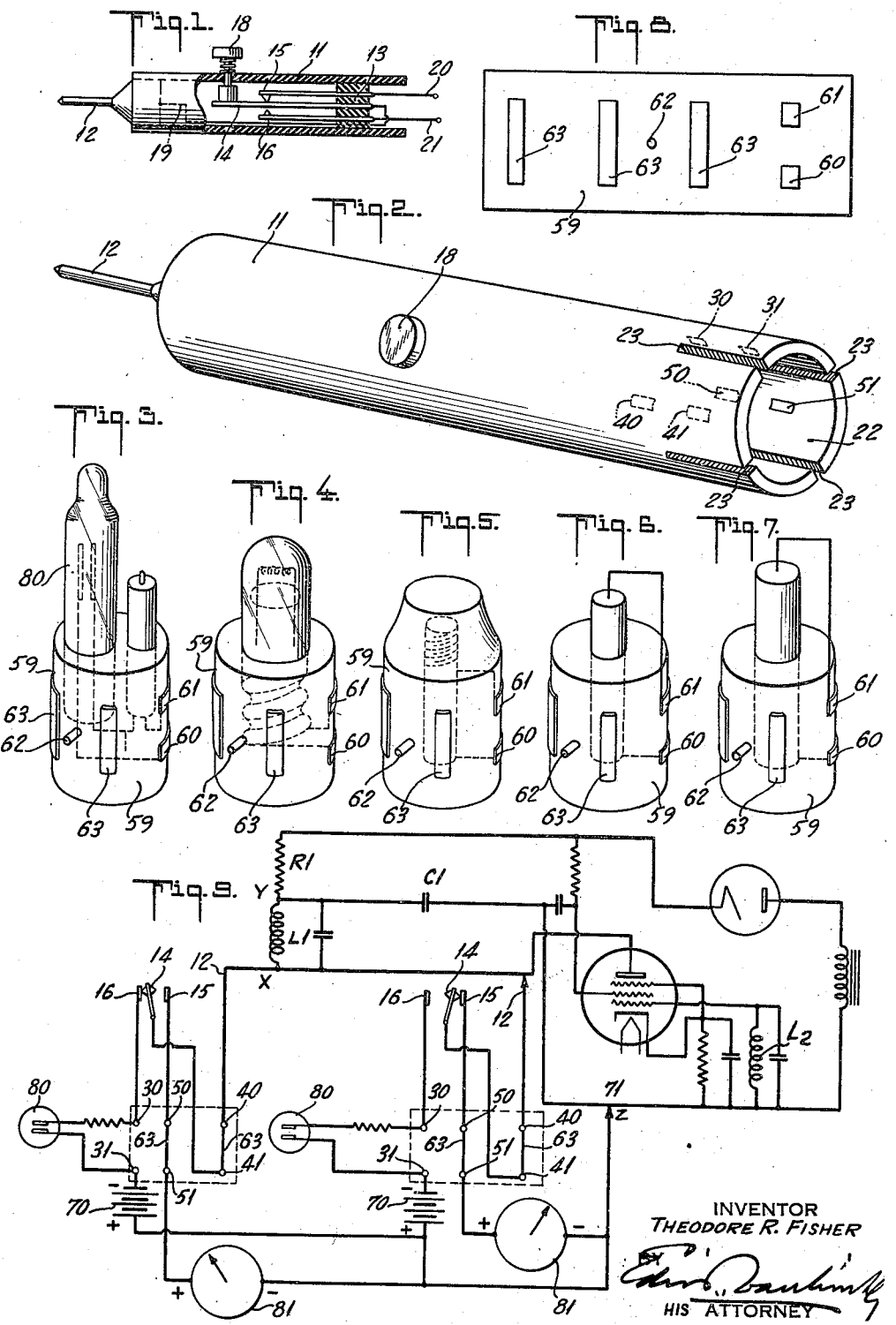
INVENTOR
THEODORE R. FISHER
HIS ATTORNEY Patented Apr. 15, 1947

2,418,872

UNITED STATES PATENT OFFICE 2,418,872

DUPLEX INDICATING TEST PROD

Theodore R. Fisher, Brandon, Fla.

Application February 6, 1945, Serial No. 576,454

5 Claims. (Cl. 200—51.06)

My invention relates to prods used in testing electrical circuits and consists of a pin or test prod mounted in an insulated handle, which is contacted with the circuit to be tested; a switch contained within the same handle and controlled by a push button protruding from the handle, which connects the test prod to either of two external circuits to which the device is connected by suitable connecting wires, and a plug carrying auxiliary devices adapted to fit into the end of the handle opposite the contact prod pin, serving to connect an additional component, such as an indicating lamp, a fuse, a resistance, or a condenser, in series with either or both external connecting wires, according to the requirements of the external testing circuits.

The object of this invention is to provide a quick and convenient means of transferring electric current at a given point under test, from one test circuit to another; to provide visual indication of conditions in the circuit under test, at a place close to the point being tested, so that the operator is not required to look away from the wiring under test in order to read an external indicator; and to provide a light, compact, easily portable and durable testing instrument.

The foregoing and other features of my invention will now be described in connection with the accompanying drawing forming part of this specification in which I have illustrated my Duplex Indicating Test Prod in its preferred form after which I shall point out in the claims those features which I believe to be new and of my own invention.

In the drawings:

Figure 1 is a side view of my test prod in part section showing the switch mounting.

Figure 2 is a perspective view of my test prod showing the special socket on the end thereof.

Figures 3, 4, 5, 6 and 7 show accessories mounted in a plug adapted to slip into the socket.

Figure 8 is a view of the cylindrical portion of the plug locating the contact points and jumper contacts.

Figure 9 is a wiring diagram of a typical test in which my test prod is indicated diagrammatically connected in both test circuits. The one shown on the right indicates the circuit when the push button on the test prod is extended. The circuit shown on the left of the diagram is the one when the push button is depressed.

In the carrying out of my invention I employ a tubular handle 11 preferably made of insulating material; on one end thereof is mounted a test point 12. Within the handle is a double throw switch 13 having a movable member 14 and two contact members 15, 16.

Extending through the handle is means 17 to operate the switch. I have shown a push button 18 but do not confine myself to that specific structure.

The prod point 12 is connected to the member 14 by electrical connection 19. Lead 20 is connected to 15 and lead 21 connects with switch member 16.

In Figure 2 the end opposite the prod point 12 is a slip socket 22 provided with three pairs of contacts spaced around the interior 90° apart, 30—31, 40—41, 50—51; also four slots 23 are provided to position the accessory plug within the socket.

In this construction the prod point 12 is electrically connected to contact 40, switch member 15 is electrically connected to contact 50 and switch member 16 is electrically connected to contact 30.

By referring to Figures 3 to 7 inclusive which illustrate the many possibilities in the use of my test prod, Figure 3 shows a plug in which is mounted a neon lamp, Figure 4 shows the plug with an incandescent lamp. Figure 5 shows how a fuse may be connected in the plug. Figure 6 illustrates the resistance plug while Figure 7 is my condenser plug. The terminals of these accessories are connected to contact points 60 and 61 on the outside 59 of the plug in each case as shown. On the outside of the plug is a pin 62 adapted for engagement with one of the slots 23 in the side of the socket on the end of the handle 11.

When the plug is inserted in the socket, the contacts 60 and 61 make connection with either contacts 50—51, 40—41, 30—31, depending on what slot 23 the pin 62 engages. The other pairs of contacts are connected to each other by one of the jumper strips 63.

It will be noted that no matter what type of accessory plug is used, the plug always is provided with a pair of contacts and three longer or jumper contacts spaced 90° around the surface of the plug. The object of the three jumper contacts 63 on plug 59 is to provide a means of connecting together all three pairs of contacts within the socket so that when the plug is in this position the prod may be used without the necessity of connecting the plug accessory in the circuit, in which event the modification of my test prod illustrated in Figure 2 becomes the simple embodiment of my invention shown in Figure 1. These three jumper contacts make it possible to connect any two pairs of contacts in the socket together, at the same time putting the plug accessory in circuit by means of the pair of contacts in the plug contacting with a pair of contacts in the socket.

My test prod may be used with any two external circuits such as high and low range voltmeters, voltmeter and ohmeter, high and low impedance output audio or radio frequency test oscillators, high and low impedance input to loud speaker or audio amplifier, etc. With the neon lamp plug and high voltage battery it may be used as high voltage indicator and leakage or continuity tester or condenser tester, etc. With low voltage lamp and battery it may be used as a tester for low resistance electrical systems. Any suitable combination of meters, indicating lamps, batteries or other apparatus may be used with the test prod as desired by the operator. By using this duplex test prod it is convenient to switch from one testing circuit to another and back by merely pushing and releasing the push button 18 in the handle.

To illustrate the method of approach in a test and the use of my duplex test prod, I will explan a simple test of a radio chassis.

Figure 9 illustrates a typical wiring diagram of a pentode amplifying tube type 58 or 78 as used in a radio receiver, showing the double circuit before and with the push button 18 depressed. In testing this type of circuit, the duplex prod may be used with voltmeter, neon light indicator and auxiliary battery, in which case the neon light 80 is connected to terminals 30 and 31 of the test prod, thus putting the light in series with the lower blade 16 of the push button switch.

Terminal 31 is connected by flexible wire to the negative side of a high voltage battery 70. The positive side of the battery is connected to the chassis of the receiver as at 71, preferably by means of a clip or other semi-permanent device. Terminal 51 of the prod socket is connected by flexible wire to the positive terminal of the voltmeter 81 and the negative terminal is semi-permanently connected to the chassis. We are now ready for testing.

Test #1

With receiver power supply turned on and tubes heated to operating temperature, the duplex prod 12 is touched to the plate terminal of the tube (point X in the diagram) leaving the push button of the prod extended. If all the components of the plate circuit are in good order, current will flow from the power transformer secondary winding, through the rectifier, through decoupling resistance R1 and plate transformer primary L1 to point X which is at plate potential, thence through prod 12 to contact 40, through jumper 63 and contact 41 to center blade 14 of switch, thence through contact to upper blade 15, then through contact 50, jumper 63, contact 51 and flexible wire to voltmeter 81, causing a voltage indication on the meter; from voltmeter 81 current flows through wire and clip connection at Z to chassis, returning to transformer winding.

If the circuit is broken in resistance R1 or plate transformer primary L1, no current will flow through the meter, and no voltage will be indicated. If either of these two components is grounded or if condenser C1 is shorted, point X will be at ground potential, no current will flow through the meter, and no voltage will be indicated. If tube plate is shorted internally to cathode, point X will be at cathode potential and low voltage will be indicated on meter 81 which will rise to normal value when the tube is removed from its socket.

Test #2

If no voltage is indicated on meter 81, the prod is left in contact with the plate terminal and the push button 18 is depressed. (See position indicated at left in diagram.) In this condition, if plate transformer primary L1 and condenser C1 are in good order, current will flow from the negative pole of the battery through connecting wire and terminal 31, thence through contact 31, through the neon lamp 80 and contacts 30 and thence through blade 16 of switch and contact to blade 14, then through contact 41, jumper 63 and contact 40 to prod 12, thence through contact at point X, through plate transformer primary L1 to one plate of condenser C1. From the other plate of the condenser, current will flow to chassis, then through clip connection and wire, returning to positive pole of the battery 70.

This current flow, which will cause neon lamp 80 to light will continue only until condenser C1 is charged to the extinction voltage of the neon tube, when the neon tube will be extinguished. Thus if the neon tube lights momentarily, it is an indication that transformer primary L1 and condenser C1 are good and that resistance R1 is defective.

If condenser C1 is shorted, or if transformer primary L1 or resistance R1 is grounded, the current flow will be continuous and the neon light will burn steadily.

If transformer primary L1 is broken, no current will flow and the neon light will not burn. In this case, the test prod should be transferred to the common terminal of transformer primary L1, resistance R1 and condenser C1 (point Y) and the voltage tested with push button 18 up, as in Test #1. This will be a check on a possible broken circuit in condenser C1.

To test continuity of input circuit to control grid, prod 12 is touched to control grid terminal and push button depressed. If grid input inductance L2 is unbroken, current will flow through neon tube, switch and test prod 12 as described above, then through inductance L2 to chassis and through clip connection and back to battery, causing neon tube to light, thereby indicating that the input circuit is continuous. Any break in inductance L2 will prevent current from flowing. Any high resistance in the circuit will cause a weak light in the lamp.

In like manner, other components of the receiver may be tested for voltage, continuity, grounds and shorts.

If desired, the neon tube may be connected to terminals 40 and 41 instead of to 30 and 31 as shown, in which case it will indicate voltage for both test circuits and the meter will be required, terminal 51 being connected directly to chassis by means of flexible wire and clip.

I wish it distinctly understood that my duplex indicating test prod herein illustrated and described is in the form in which I desire to construct and use it and that changes or variations may be made as may be desirable or convenient without departing from the salient features of my invention and I therefore intend the following claims to cover such modifications as naturally fall within the lines of invention.

I claim:

1. The device of the character described comprising in combination, a tubular member made of insulating material, a double throw switch mounted within the handle, a push button extending through the wall of the handle to operate the switch, a prod point mounted in one end of the tubular member, a slip socket on the opposite end of the tubular member provided with three pairs of contacts spaced around the handle 90° apart, four slots in the socket, a plug adapted to be received within the socket having a projection adapted to engage one of the four slots in the socket to position the plug, said plug carrying three jumper contacts and one pair of contacts whereby the pair of contacts on the plug may contact with any one of three pairs of contacts within the socket while the jumper contacts connect the other pairs in the circuit, electrical connections between the prod point, switch and contacts.

2. The device of the character described comprising in combination, a tubular member made of insulating material, a double throw switch provided with one movable contact and two outer contacts mounted within the handle, a push button extending through the wall of the handle for operating the movable contact of the switch, a prod point mounted in one end of the tubular member, a socket in the opposite end thereof provided with four positioning slots and three pairs of contact points disposed around the inside of the socket, electrical connection between one of these contacts and the prod point and between the other contact of this pair and the movable contact of the switch, electrical connections between the outer blades of the switch and to one contact of each of the pairs of socket contacts.

3. The device of the character described comprising in combination, a tubular member made of insulating material, a double throw switch provided with one movable contact and two outer contacts mounted within the handle, means extending through the wall of the handle for operating the movable contact of the switch, a prod point mounted in one end of the tubular member, a socket in the opposite end thereof provided with four positioning slots and three pairs of contact points disposed around the inside of the socket, electrical connection between one of these contacts and the prod point and between the other contact of this pair and the movable contact of the switch, electrical connections between the other two blades of the switch and to one contact of each of the pairs of socket contacts, an accessory carrying plug having a pin adapted to slide in one of the four slots of the sockets for positioning the plug within the socket, said plug carrying three jumper contacts and one pair of double contacts, said jumper contacts adapted to connect two pairs of the contacts within the socket, while the pair of contacts on the plug connects the plug accessory in the circuit for test.

4. The device of the character described comprising in combination, a tubular member made of insulating material, a double throw switch provided with one movable contact and two outer contacts mounted within the handle, means extending through the wall of the handle for operating the movable contact of the switch, a prod point mounted in one end of the tubular member, a socket in the opposite end thereof provided with four positioning slots and three pairs of contact points disposed around the inside of the socket, electrical connection between one of these contacts and the prod point and between the other contact of this pair and the movable contact of the switch, electrical connections between the other two blades of the switch and to one contact of each of the pairs of socket contacts, a plug carrying three jumper contacts adapted to connect together each pair of contacts in the socket.

5. The device of the character described comprising in combination, a tubular member made of insulating material, a double throw switch provided with one movable contact and two outer contacts mounted within the handle, means extending through the wall of the handle for operating the movable contact of the switch, a prod point mounted in one end of the tubular member, a socket in the opposite end thereof provided with four positioning slots and three pairs of contact points disposed around the inside of the socket, electrical connection between one of these contacts and the prod point and between the other contact of this pair and the movable contact of the switch, electrical connections between the other two blades of the switch and to one contact of each of the pairs of socket contacts, a plug carrying on its outer cylindrical surface a pair of contacts and three jumper contacts, means to position the plug within the socket in four different positions so that the jumper contacts may connect together all of the three pairs of contacts within the socket in one position and in three other positions, the pair of contacts on the plug engaging one of the pairs of contacts within the socket at the same time connecting together the other two pair of contacts within the socket.

THEODORE R. FISHER.

REFERENCES CITED

The following references are of record in the file of this patent:

UNITED STATES PATENTS

| Number | Name | Date |
|---|---|---|
| 750,689 | Pearne | Jan. 26, 1904 |
| 1,096,138 | Stearns | May 12, 1914 |
| 1,826,576 | Rump | Oct. 6, 1931 |
| 1,970,232 | Hady | Aug. 14, 1934 |
| 2,020,402 | Edwards et al. | Nov. 12, 1935 |
| 2,137,569 | Friedman | Nov. 22, 1938 |